United States Patent [19]

Scott

[11] Patent Number: 4,457,890

[45] Date of Patent: Jul. 3, 1984

[54] LIQUID METAL COOLED NUCLEAR REACTORS

[75] Inventor: Donald Scott, Northwich, England

[73] Assignee: National Nuclear Corporation, London, England

[21] Appl. No.: 232,289

[22] Filed: Feb. 6, 1981

[30] Foreign Application Priority Data

Feb. 8, 1980 [GB] United Kingdom ............... 8004367

[51] Int. Cl.$^3$ .................... G21C 3/00; G21C 9/00
[52] U.S. Cl. .................... 376/362; 376/461; 376/352; 376/293; 376/404; 376/365
[58] Field of Search ............... 376/362, 364, 365, 461, 376/352, 175, 176, 178, 293, 404

[56] References Cited

U.S. PATENT DOCUMENTS

| | | | |
|---|---|---|---|
| 2,848,404 | 8/1958 | Treshow. | |
| 3,296,085 | 1/1967 | Peck et al. | 376/364 |
| 3,345,266 | 10/1967 | Mann et al. | 376/175 |
| 3,383,287 | 5/1968 | Jackson | 376/352 |
| 3,486,973 | 12/1969 | Georges et al. | 376/175 |
| 3,501,377 | 3/1970 | Germer | 376/365 |
| 3,671,394 | 6/1972 | Bernath et al. | |
| 3,785,924 | 1/1974 | Notari | 376/352 |
| 3,992,256 | 11/1976 | Lleres et al. | 376/404 |
| 4,198,272 | 4/1980 | Salmon | 376/178 |
| 4,352,778 | 10/1982 | Arnaud et al. | 376/365 |

FOREIGN PATENT DOCUMENTS

| | | | |
|---|---|---|---|
| 112476 | 9/1979 | Japan | 376/352 |
| 1382392 | 1/1975 | United Kingdom. | |
| 1445664 | 8/1976 | United Kingdom. | |
| 1480854 | 7/1977 | United Kingdom. | |
| 2012470A | 7/1979 | United Kingdom. | |
| 2051459A | 1/1981 | United Kingdom. | |

Primary Examiner—Harvey E. Behrend
Attorney, Agent, or Firm—Pollock, Vande Sande and Priddy

[57] ABSTRACT

A liquid metal cooled nuclear reactor of the kind wherein a fuel assembly is supported on a diagrid and submerged in a pool of coolant. The diagrid comprises a plenum supported on a load bearing undershell and has an array of resilient spikes upstanding from the upper face of the plenum each for locating a fuel subassembly. The load of the fuel assembly is distributed over the upper face plate of the plenum and transmitted to the undershell by an array of strut members.

5 Claims, 4 Drawing Figures

LIQUID METAL COOLED NUCLEAR REACTORS

This invention relates to liquid metal cooled nuclear reactors.

BACKGROUND OF THE INVENTION

In one kind of liquid metal cooled nuclear reactor which is a fast breeder reactor the fuel assembly is supported on a diagrid and submerged in a pool of liquid metal in a vessel. The diagrid is carried on a support structure from the wall of the vessel and serves as a plenum for distributing coolant throughout the fuel assembly. The fuel assembly comprises a plurality of replaceable sub-assemblies which upstand from the diagrid in side-by-side array and are arranged in groups. Each group of sub-assemblies is carried on a carrier of massive steel which serves to protect the diagrid against damage during fuel replacements and by irradiation. In our U.S. Pat. No. 4,256,538 for liquid metal cooled fast breeder nuclear reactors there is disclosed a construction of this kind of liquid metal cooled fast breeder nuclear reactor wherein the diagrid comprises a discrete plenum and an undershell. The undershell normally carries the entire load of the fuel assembly thereby leaving the plenum substantially load free, the loading being freely transmitted through the plenum by means of a plurality of struts formed integrally of the carriers. In the event of failure of the undershell the normally unloaded plenum can accept the load of the fuel assembly and in the event of a breach of the plenum the undershell, in cooperation with other reactor structure, provides a partial secondary containment whereby the rate of leakage from the breach is reduced sufficiently to maintain the reactor safe pending shut down. However, in order to reduce the capital cost of the construction it has been proposed to eliminate the carriers and in published British application No. GB 2,051,459A there is described a construction wherein the sub-assembly is supported on a discrete resilient spike upstanding through the plenum from the lower face plate, shielding of the diagrid being achieved by massive steel bushes interposed between the sub-assemblies and the upper face plate of the diagrid. The spikes, which are readily replaceable when damaged during refuelling operations, provide a measure of flexibility whereby the sub-assemblies can be displaced laterally to avoid serious stressing in a peripherally restrained fuel assembly. In this construction, of course, the functions of plenum and fuel assembly support are not separated and there is no inherent safeguard of the coolant flow in the event of failure of the plenum.

It is an object of the present invention to provide a construction of liquid metal cooled nuclear reactor not including carriers for the fuel sub-assemblies but wherein the functions of fuel assembly support and coolant plenum are performed by discrete components of the diagrid each of which can serve the function of the other in the event of failure of one of the components.

SUMMARY OF THE INVENTION

According to the present invention in a liquid metal cooled nuclear reactor comprising a fuel assembly supported on a diagrid and submerged in a pool of liquid metal coolant in a vessel, the diagrid comprising, in combination, a short upright generally cylindrical plenum for containing coolant under pressure and a load supporting undershell on which the plenum is mounted, the combination being supported at a peripheral flange of the undershell, the diagrid has an array of resilient spikes upstanding from its upper face plate for supporting discrete fuel sub-assemblies in side-by-side array and there is an array of spaced strut members extending downwardly through the plenum from the upper face plate for transferring the load of the fuel assembly from the upper face plate of the plenum to the undershell. In a nuclear reactor construction according to the invention the load of the fuel assembly is distributed in generally uniform manner over the upper face plate of the plenum by way of the resilient spikes thence directly to the undershell by way of the strut members so that compressive loading of the plenum is avoided. In the event of a breach of the plenum there is a partial secondary containment constituted by the envelopment of the plenum by the fuel assembly on its upper face and the undershell at its under face which can be supplemented at the periphery of the plenum by additional reactor structure such as a fuel assembly restraint barrel so that the rate of loss of coolant can be reduced to a safe level.

Preferably the plenum is provided with internal bracings between the upper and lower face plates for the containment of coolant pressure in the plenum and the strut members, which may be extensions of the bracings, are secured to the undershell. In the event of a circumferential fracture of the undershell, this being considered to be the most serious possible failure of the diagrid construction, the plenum and fragmented undershell being tied together equate to a circular stiff plate edge supported in the region that overlies the circumferential fracture thereby enabling it to continue to support the distributed loading of the fuel assembly.

Preferably the plenum comprises upper and lower flanged sections, the flange abutment being disposed mid length of the plenum wall thereby to promote axisymmetrical flexibility.

BRIEF DESCRIPTION OF THE DRAWINGS

By way of example, a construction of liquid metal cooled fast breeder nuclear reactor embodying the invention is described with reference to the accompanying drawings wherein.

PREFERRED EMBODIMENTS

Figure 1:
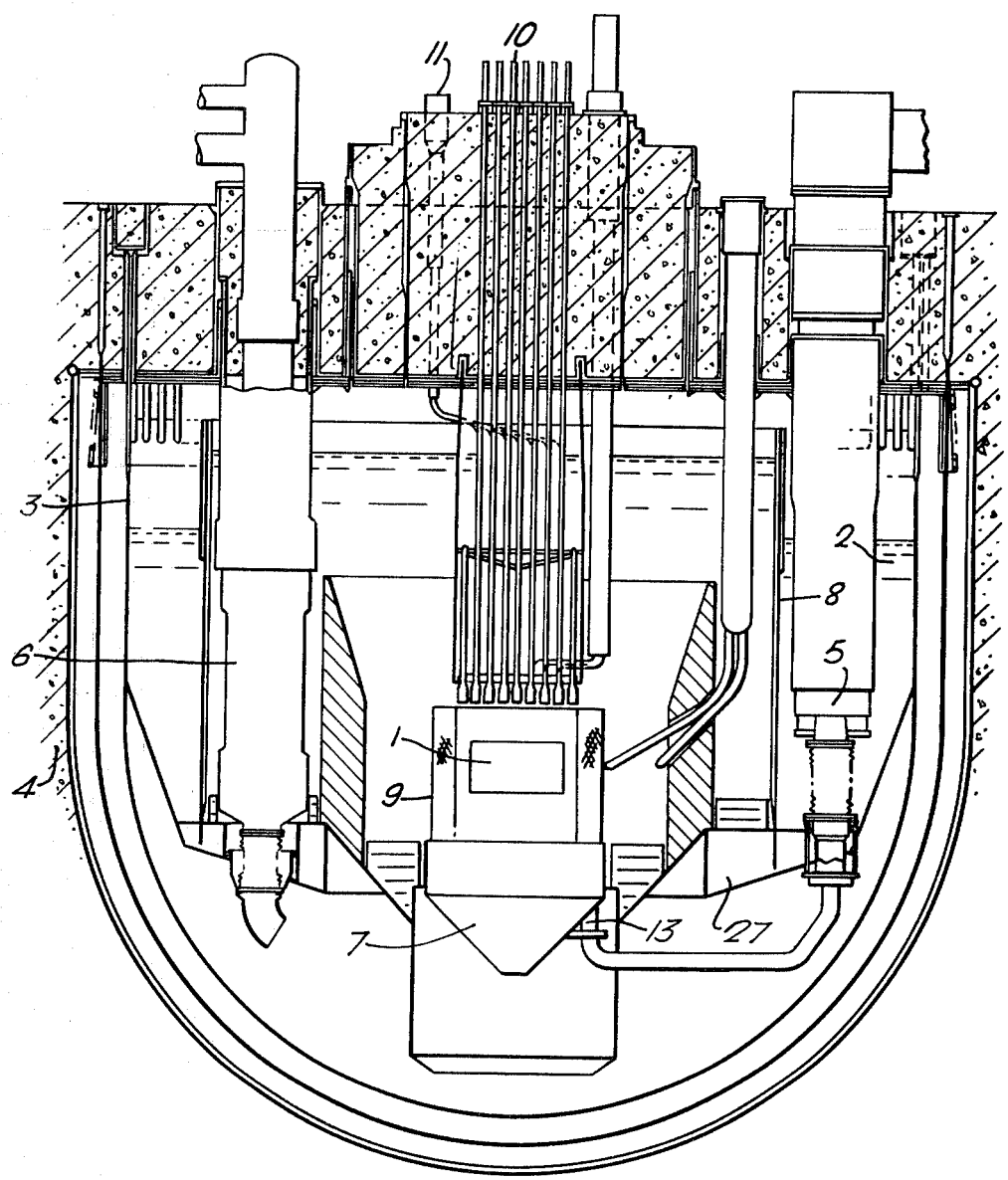
FIG. 1 is a diagrammatic side view in section of the nuclear reactor construction.

FIG. 1 illustrates a liquid metal cooled fast breeder nuclear reactor having a fuel assembly 1 submerged in a pool 2 of liquid sodium coolant in a primary vessel 3. The primary vessel is suspended from the roof of a containment vault 4 and there is provided a plurality of coolant pumps 5 and heat exchangers 6 only one of each of said pumps and heat exchangers being shown. The fuel assembly 1 supported on a diagrid 7 is housed with the heat exchangers in a core tank 8 while the pumps 5, which deliver coolant to the diagrid each by way of a riser 13, are disposed outside of the core tank. The core or fuel assembly 1 comprises a plurality of sub-assemblies which upstand from the diagrid in closely spaced side-by-side array and the fuel assembly is embraced by a core restraining barrel 9 to provide peripheral restraint. Control rods 10 and instrumentation 11 penetrate the roof of the vault.

Figure 2:
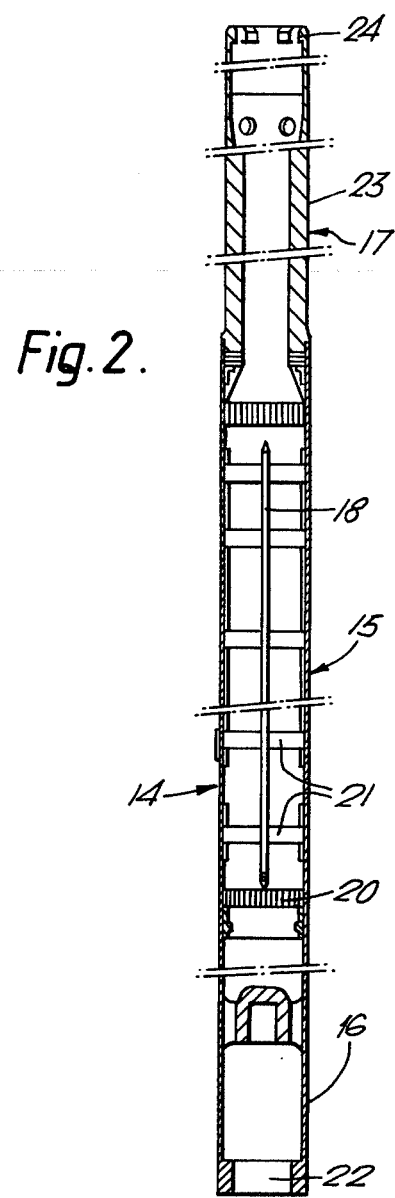
FIG. 2 is a side view of a fuel sub-assembly drawn to a larger scale.

The sub-assemblies designated 14 in FIG. 2 each comprise a central fuel section 15, a lower end locating section 16 and an upper end neutron shielding section 17. The fuel section comprises a bundle of elongate fuel pins 18 (only one being shown in FIG. 2) enclosed within a tubular wrapper of hexagonal cross-section. The pins are supported within the wrapper at their lower ends by a grid 20, and are braced intermediate their lengths by cellular grids 21 of honeycomb form. The lower end locating section 16 has a socket 22 which is arranged to plug on to a spike associated with the diagrid 7 while the upper end neutron shielding section 17 comprises a massive steel tube 23 having a lifting head 24.

Figure 3:
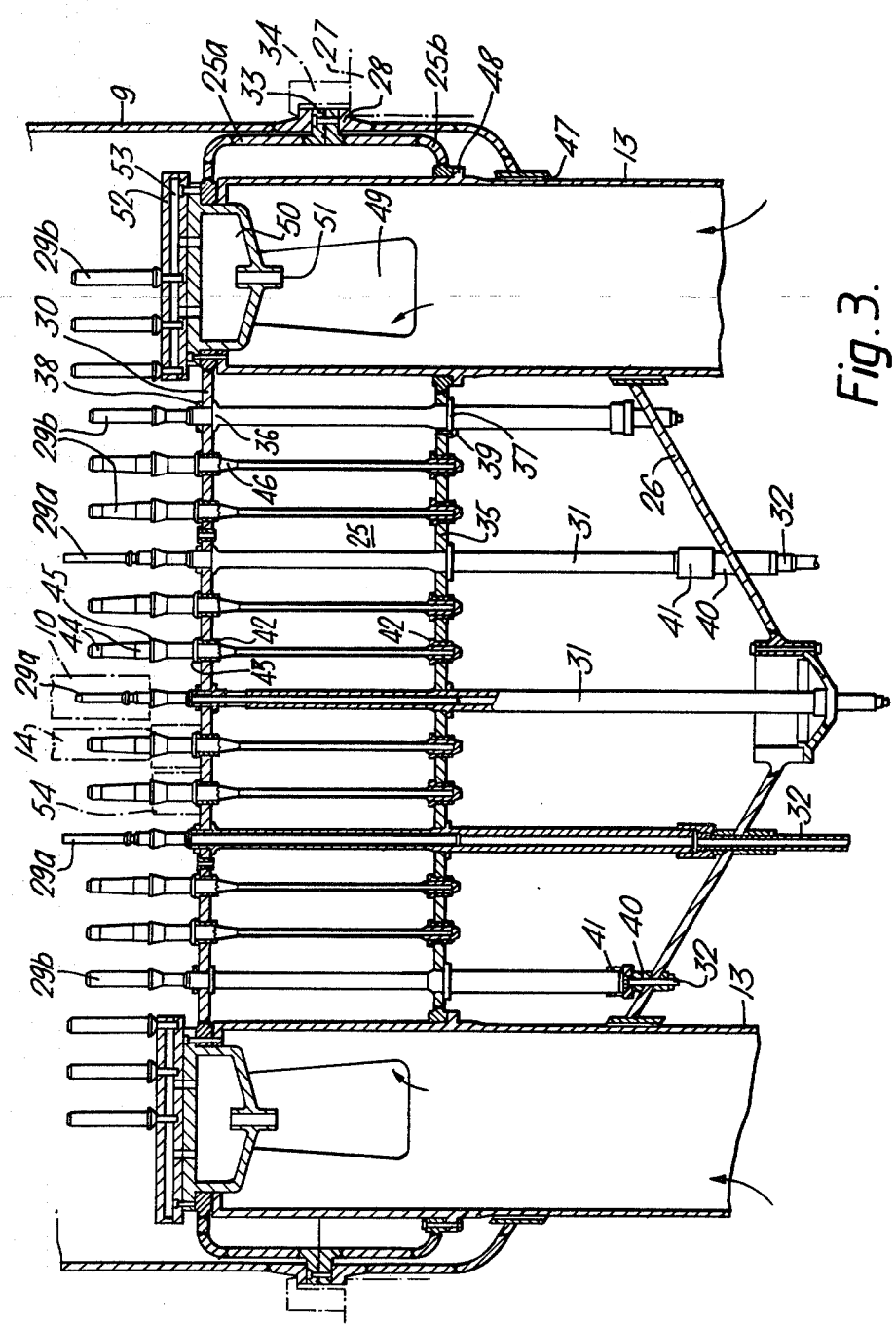
FIG. 3 is a side view in section of a fuel assembly supporting diagrid drawn to a smaller scale than that of FIG. 2.
Figure 4:
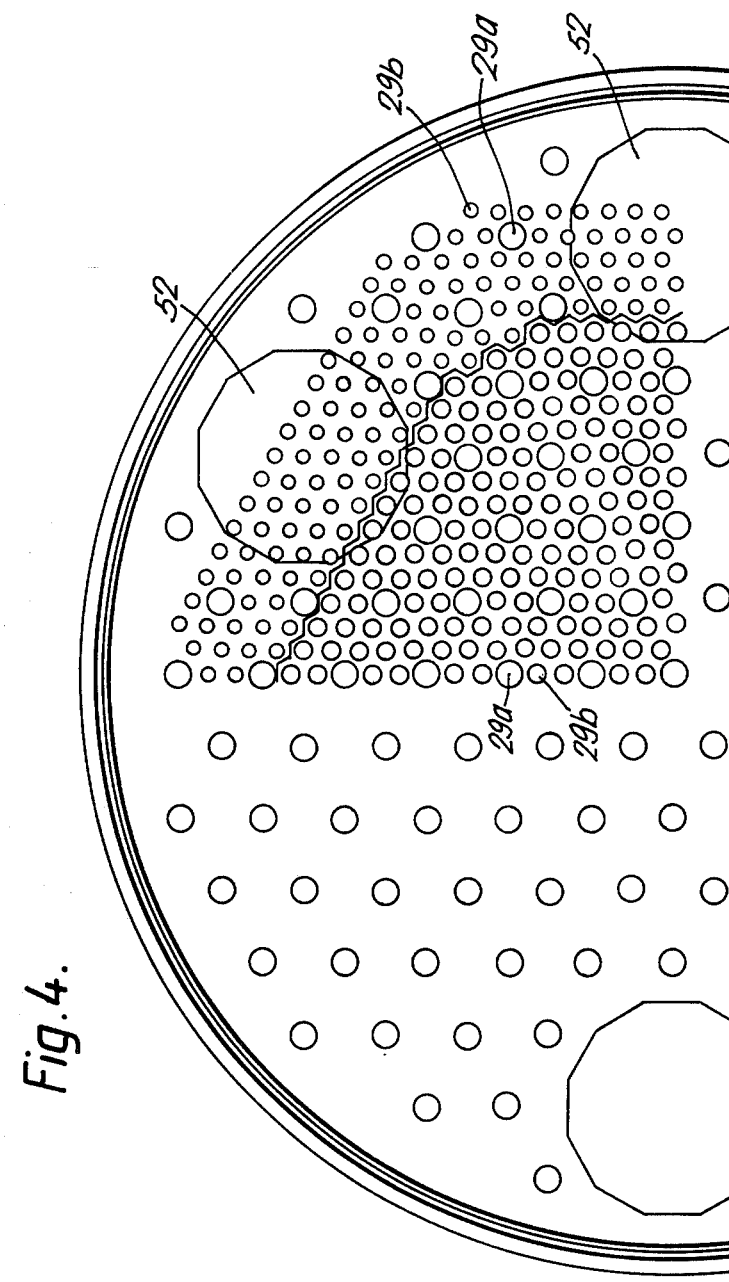
FIG. 4 is a half plan view of the diagrid shown in FIG. 3.

The diagrid shown in greater detail in FIGS. 3 and 4 comprises, in combination, a short upright generally cylindrical plenum 25 and a load supporting undershell 26 on which the plenum is mounted. The combination is supported from a beam structure, hereinafter termed a strongback 27, by a peripheral flange 28 of the undershell, the strongback 27 being carried by the wall of the primary vessel 3. The diagrid 7 has an array of resilient spikes 29 upstanding from an upper face plate 30 for supporting discrete fuel sub-assemblies in side-by-side relationship, and an array of spaced strut members 31 extending downwardly through the plenum from the upper face plate 30 for transferring the load of the fuel assembly from the upper face of the plenum to the undershell 26. The strut members 31 are tubular and are rigidly secured to the undershell by bolts 32. The plenum 25 is of upper and lower sections 25a, 25b joined at abutting flanges 33 disposed mid length of the plenum, the joined flanges being floatably mounted on the peripheral flange 28 of the undershell. The combination of plenum 25 and undershell 26 is held down to the strongback 27 by clamps 34 shown in broken line. The fuel assembly is surrounded by the cylindrical restraint structure 9 whereby the fuel sub-assemblies are centripetally clamped and the restraint structure being supported on the plenum flanges 33 loosely encloses the upper section of the plenum.

The fuel assembly restraint structure 9 and the undershell 26 provide a shroud for the periphery and underside of the plenum and the shroud together with the fuel assembly above the plenum form a secondary containment envelope whereby, in the event of a breach of the plenum, leakage of coolant is reduced to a rate which enables the nuclear reactor to be shut down in good time before voiding of the fuel assembly occurs. In the event of a fracture of the undershell 26 the entire weight of the fuel assembly is carried by the plenum 25 which by design is capable of performing such function until such time as the reactor can be safely shut down; the strut members 31 being attached to the undershell retain the fragment of undershell thereby retaining sufficient stiffness of the diagrid structure to support the load. The siting of the support flange 33 of the plenum mid length of the cylindrical wall enables the upper and lower portions of the plenum wall to provide axisymmetrical flexibility thereby to accommodate differences in radial thermal expansion between the diagrid and the strongback.

In greater detail and with particular reference to FIGS. 3 and 4 the plenum 25 is bounded by the upper face plate 30 and a lower face plate 35 each of which is mechanically secured to the strut members 31 so that the strut members serve to stay the face plates against internal pressure. The strut members each have an upper and lower flange 36, 37 which abut the undersides of the face plates, the upper face plate being clamped to its support flange by a nut 38 and the lower face plate being secured to its support flange by set bolts 39. Corresponding with the strut members 31 the undershell has bushes 40 which carry the bolts 32, and the bolts 32 captivate screwed collars 41 which engage with the lower ends of the strut members. Thus by means of the screwed collars 41 the lengths of the strut members can be adjusted to provide uniform distribution of the weight of the fuel assembly over the undershell. Each of the strut members 31 is extended upwardly by a resilient spike 29a for carrying a shut down or control rod 10 or, in the outer region of the fuel assembly, a breeder sub-assembly, while interposed between the strut members there are disposed a plurality of upwardly extending intermediate spikes 29b for carrying fuel sub-assemblies 14. These spikes 29b are located by bushes 42 carried by the upper and lower face plates, the spikes each being supported from the upper face plate by a flange 43 and arranged to penetrate both face plates so that they are hydraulically balanced. The spikes have spigot surfaces 44 for engaging the sockets 22 of the sub-assemblies and shoulders 45 for supporting the sub-assemblies. The spikes have a clearance fit in the upper bushes 42 so that together with their inherent resilience they provide adequate articulation or the lower ends of the sub-assemblies thereby avoiding unacceptably high loading in the fuel assembly such as would normally be caused by the peripheral restraint. The resilient spikes are tubular, those designated 29a for supporting control and shut down rods being open at the lower ends for the conduction of control rod supporting coolant while those designated 29b for supporting fuel and breeder sub-assemblies are closed at their lower ends and have side apertures 46 disposed within the plenum for directing coolant flow to the sub-assemblies. The fuel and breeder sub-assembly supporting spikes are readily replaceable and contain gags (not shown) for metering coolant flows appropriate to each sub-assembly. Massive steel bushes 54 standing on the upper face plate 30 of the plenum and surrounding the spikes 29 provide neutron shielding for the diagrid.

The undershell 26 has reinforced openings 47 through which the coolant risers 13 pass to be secured to the underside of the plenum at flanges 48 and the risers have side openings 49 through which coolant can flow into the plenum thence through the apertures 46 in the spikes and upwardly through the sub-assemblies. The generally blind ends of the risers 13 carry auxiliary plenums 50 which are each fed with coolant through a restrictor 51. The plenums 50 each carry a mounting 52 for spikes 29b which carry sub-assemblies disposed immediately above the risers and which are fed with coolant from the plenum by way of manifold 53. Because these sub-assemblies are in the outermost region of the fuel assembly they are not subject to such severe loading due to the centripetal restraints and therefore do not require a high degree of articulation. In the event of failure of the undershell the risers assist the plenum in supporting the weight of the fuel assembly.

I claim:

1. A liquid metal cooled nuclear reactor comprising:

a vessel for containing a pool of liquid metal coolant;

a fuel assembly positioned to be submerged in the pool of coolant;

a generally cylindrical plenum for containing inlet pressure liquid metal coolant for the fuel assembly and having an upper plate and a lower plate;

a load-bearing undershell for providing a secondary containment for coolant;

an array of resilient spikes upstanding from said upper plate, the fuel of said fuel assembly being carried on said spikes;

an array of spaced strut members less in number than the number of said spikes and extending downwardly from said upper plate to said undershell so as to directly support only certain ones of said spikes, other ones of said spikes without direct strut member support being supported in bushes in said upper plate and in said lower plate so that fuel dead-weight is distributed over said plenum; and, means for supporting said plenum on said strut members and said strut members on said undershell so that said fuel dead-weight is transmitted from said plenum to said undershell by said strut members without compression loading of said plenum.

2. A nuclear reactor according to claim 1 which further includes means carried by each of said strut members for bracing said upper face plate and said lower face plate so as to provide containment of coolant pressure in said plenum.

3. A nuclear reactor according to claim 1 wherein the plenum comprises upper and lower flanged sections, the flange abutment being disposed mid length of the plenum wall and in supportive abutment with the peripheral flange of the undershell thereby to promote axisymmetrical flexibility.

4. A nuclear reactor according to claim 3 wherein the strut members have screw thread adjustment means whereby their length can be adjusted to provide uniform distribution of the weight of the fuel assembly over the undershell.

5. A nuclear reactor according to claim 1 wherein the spikes are supported from the upper face plate by a flange and arranged to penetrate both face plates so that they are hydraulically balanced.

* * * * *